United States Patent [19]

Ida

[11] Patent Number: 4,563,494
[45] Date of Patent: Jan. 7, 1986

[54] SYNTHETIC RESIN COMPOSITION AND PROCESS FOR PRODUCING THE SAME

[75] Inventor: Kozo Ida, Otake, Japan

[73] Assignee: Mitsubishi Rayon Co., Ltd., Tokyo, Japan

[21] Appl. No.: 548,444

[22] Filed: Nov. 3, 1983

[30] Foreign Application Priority Data

Nov. 8, 1982 [JP] Japan .................................. 57-195800
Nov. 8, 1982 [JP] Japan .................................. 57-195801
Nov. 8, 1982 [JP] Japan .................................. 57-195802

[51] Int. Cl.[4] .................. C08F 220/04; C08F 230/04; C08K 3/10; C08K 5/09
[52] U.S. Cl. .................................... 524/398; 523/137; 524/300; 524/310; 524/322; 524/388; 524/404; 524/413; 524/711; 524/765; 524/780
[58] Field of Search ............... 526/241; 524/404, 780, 524/765, 730, 176, 398, 711, 413, 310, 300, 322, 388; 523/137

[56] References Cited

U.S. PATENT DOCUMENTS

| | | | |
|---|---|---|---|
| 3,142,655 | 7/1964 | Bobear | 524/403 |
| 3,615,627 | 10/1971 | Rust | 430/281 |
| 3,950,271 | 4/1976 | Linares et al. | 524/403 |
| 3,996,188 | 12/1976 | Laur | 524/780 |
| 4,002,597 | 1/1977 | Dickens | 524/403 |
| 4,107,156 | 8/1978 | Sunamori et al. | 524/403 |
| 4,132,841 | 1/1979 | Champenois | 526/284 |
| 4,146,588 | 3/1979 | Sunamori et al. | 526/91 |
| 4,339,501 | 7/1982 | Inoue et al. | 428/404 |
| 4,366,278 | 12/1982 | Hamaoa et al. | 524/403 |
| 4,390,656 | 6/1983 | Neise et al. | 524/528 |
| 4,399,064 | 8/1983 | Penneck | 523/173 |

FOREIGN PATENT DOCUMENTS

| | | | |
|---|---|---|---|
| 0056851 | 5/1976 | Japan | 524/403 |
| 0037005 | 3/1979 | Japan | 524/403 |
| 6098216 | 8/1981 | Japan | 524/403 |
| 6129213 | 10/1981 | Japan | 524/403 |

Primary Examiner—Herbert J. Lilling
Attorney, Agent, or Firm—Oblon, Fisher, Spivak, McClelland & Maier

[57] ABSTRACT

A synthetic resin composition is provided which comprises at least one lanthanoid-containing compound selected from the group consisting of oxides, hydroxides, inorganic and/or organic acid salts and complexes of lanthanoids and a vinyl polymer.

The resin composition has a high neutron ray-shielding capacity and excellent optical and mechanical properties.

20 Claims, No Drawings

4,563,494

SYNTHETIC RESIN COMPOSITION AND PROCESS FOR PRODUCING THE SAME

BACKGROUND OF THE INVENTION

The present invention relates to a synthetic resin composition containing a lanthanoid and a process for producing the same.

Synthetic resins such as methacrylic resin have been used widely in various fields, since they have excellent transparency, weather resistance and mechanical properties. However, they could not be used for shielding radiation because they have no such properties.

Recently, radiation-shielding materials comprising a methacrylic resin containing lead have been developed (see Japanese Patent Publication No. 2360/1960 and Japanese Patent Laid-Open Nos. 9994/1978, 9995/1978, 9996/1978 and 63310/1978).

However, these radiation-shielding materials containing lead have only an insufficient capacity of shielding neutron rays, though they shield effectively electromagnetic waves such as X-rays and $\gamma$-rays and charged particles such as $\alpha$-rays and $\beta$-rays.

It has been known to add a boron compound to a polyethylene or methacrylic resin to obtain a high-molecular material capable of shielding neutron rays (Japanese Patent Laid-Open No. 144597/1980). According to this process, a high neutron rays-absorbing capacity can be obtained. However, the capacity is gradually reduced as the neutron absorption proceeds, since helium and lithium formed by the neutron absorption have no appreciable neutron-absorbing capacity. Further, the optical and mechanical properties of the resin are yet unsatisfactory.

It has also been known that a rare earth element has a thermal neutron-absorbing capacity higher than that of boron. However, this element has only a poor compatibility with the synthetic resin, since it is a solid metal. Thus, synthetic resins having excellent optical and mechanical properties have not been obtained yet.

SUMMARY OF THE INVENTION

An object of the present invention is to provide a synthetic resin composition having a high neutron rays-shielding capacity and excellent optical and mechanical properties.

Another object of the invention is to provide a process for producing a desired synthetic resin composition by adding a compound containing a lanthanoid to a synthetic resin.

According to the present invention, a synthetic resin composition is provided which contains a polymer comprising mainly a vinyl monomer and at least one compound containing a lanthanoid selected from the group consisting of oxides, hydroxides, inorganic and/or organic acid salts and complexes of lanthanoids.

The synthetic resin composition of the present invention can be obtained by incorporating a lanthanoid-containing compound into a synthetic resin.

Therefore, processes for obtaining the composition of the present invention are not particularly limited and various processes can be employed. For example, there may be mentioned a process wherein a lanthanoid-containing compound is blended with a synthetic resin, a process wherein a lanthanoid-containing compound is dispersed or dissolved in a resin-forming starting material selected from the group consisting of a vinyl monomer, a mixture mainly comprising the vinyl monomer or a partial polymer thereof, and then polymerizing the resin-forming starting material, or a process wherein a lanthanoid-containing compound is mixed with a vinyl monomer, a monomer mixture mainly comprising the vinyl monomer or a partial polymer thereof and a solvent to effect the polymerization.

DETAILED DESCRIPTION OF THE INVENTION

As the resin-forming starting material used for producing the resin composition of the present invention, there may be mentioned a vinyl monomer, for example, at least one monomer selected from the group consisting of acrylic acid, methacrylic acid or their esters, styrene and substituted styrene, a mixture thereof with another copolymerizable vinyl monomer and partial polymers of them.

In the present invention, methyl methacrylate is particularly preferred as the vinyl monomer from the viewpoint of its weather resistance, mechanical strength and transparency. As other monomers copolymerizable with the vinyl monomer, there may be mentioned compounds selected from the group consisting of alkyl acrylates containing 1 to 4 carbon atoms in the alkyl group, alkyl methacrylates containing 1 to 4 carbon atoms in the alkyl group, styrene, $\alpha$-methylstyrene, cyclohexyl methacrylate, acrylonitrile, ethylene glycol dimethacrylate, ethylene glycol diacrylate, diethylene glycol dimethacrylate, diethylene glycol diacrylate, tetraethylene glycol dimethacrylate, tetraethylene glycol diacrylate, pentaerythritol tetramethacrylate, pentaerythritol tetracrylate, allyl acrylate and allyl methacrylate. The monomer is used in an amount of up to 50 wt.% based on the monomer mixture. The polymer content of the partial polymer used as the resin-forming starting material is desirably as low as possible for preventing damage to the high optical properties of the final polymer.

The lanthanoid-containing compound used for producing the composition of the present invention is at least one compound selected from the group consisting of oxides, hydroxides, inorganic and/or organic acid salts and complexes of a lanthanoid selected from the group consisting of lanthanum, cerium, praseodymium, neodymium, promethium, samarium, europium, gadolinium, terbium, dysprosium, holmium, erbium, thulium, ytterbium and lutetium.

As the inorganic acid salts of the lanthanoids, there may be mentioned, for example, sulfates, nitrates, carbonates, phosphate and hydrochlorides. Among them, the nitrates are particularly preferred. They include, for example, those of gadolinium, samarium, europium, lanthanum, neodymium, cerium, praseodymium, erbium, thulium, ytterbium, lutetium, holmium, promethium, terbium and dysprosium as well as magnesium gadolinium nitrate (double salt).

As the organic acid salts of the lanthanoids, there may be mentioned, for example, acetate, octylate, propionate, butyrate, isobutyrate, caproate, caprylate, caprate, laurate, linoleate, linolenate, ricinoleate, succinate, maleate, phthalate, naphthenate, levulinate, isovalerate, acetylvalerate, lactate, O-ethylglycolate, O-butylglycolate, butyl acid phosphate and ethyl acid phosphate.

As the organic acid salts, there may also be mentioned those of compounds of the general formula:

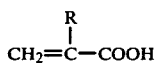

(I)

wherein R is a hydrogen atom or a methyl group, and those of compounds of the general formula:

(II)

wherein R' is a hydrogen atom or a methyl group, R" is

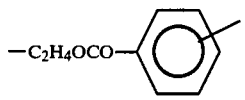

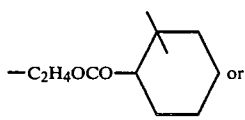

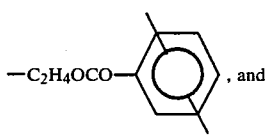, and n is 1 to 2.

As particular examples of the salts, there may be mentioned methacrylates, acrylates, 2-(meth)acryloxyethyl)succinates, 2-(meth)acryloxyethyl maleates, 2-(meth)acryloxyethyl phthalates, 2-(meth)acryloxyethyl hexahydrophthalates and 2-(meth)acryloxyethyl trimellitates.

As the lanthanoid complex used in the present invention, there may be mentioned, for example, a complex obtained by reacting a lanthanoid chloride with a β-diketone such as thenoyltrifluoroacetone, hexafluoroacetylacetone, pivaloyltrifluoroacetone, trifluoroacetylacetone, decafluoroheptanedione, heptafluorodimethyloctanedione, benzoyltrifluoroacetone, naphthoyltrifluoroacetone, dibenzoylmethane, benzoylacetone, acetylacetone, isonitrobenzoylacetone, 1-phenyl-2-methyl-4-benzoylpyrazolone-5 or isopropyltropolone, or cupferron.

The amount of the lanthanoid-containing compound is 0.001 to 10 wt.%, preferably 1 to 5 wt.%, (in terms of the lanthanoid atom) based on the resin composition. When this amount is less than 0.001 wt.%, the resulting resin composition exhibits only a poor neutron ray-shielding effect. When the amount exceeds 10 wt.%, the optical properties or mechanical strength of the composition is reduced.

The lanthanoid-containing compound may be incorporated into the synthetic resin by a method which varies depending on the use. For example, the compound is blended with the synthetic resin formed, or it is mixed with the resin-forming starting material before polymerization or alternatively it is mixed with the resin-forming starting material and the solvent before polymerization. The last process wherein the solvent is used is preferred when a no light scattering, transparent resin product is intended.

In blending the compound with the synthetic resin or dispersing it in the resin-forming starting material, it is preferred to use, for example, an oxide, carbonate, hydroxide or complex of a lanthanoid having an average particle diameter of 0.2 to 20μ. In mixing the compound with a mixture of the resin-forming starting material and the solvent, it is preferred to use an inorganic or organic acid salt such as nitrate, methacrylate or acrylate of a lanthanoid obtained by reacting a lanthanoid oxide with an inorganic or organic acid or a double salt thereof; or a complex compound such as tris(acetylacetonato)lanthanoid or tris(benzoylacetonato)lanthanoid obtained by reacting a lanthanoid chloride with acetylacetone or benzoylacetone.

As the solvent used in the polymerization reaction for forming the resin composition of the present invention, there may be mentioned a compound which can dissolve both the resin-forming starting material and the compound containing the lanthanoid, represented by the general formulae:

(1)

wherein $R_1$ is a saturated or unsaturated hydrocarbon residue having 1 to 20 carbon atoms;

(2)

wherein $R_2$ is a saturated or unsaturated hydrocarbon residue having 1 to 9 carbon atoms and $R_3$ is a saturated or unsaturated hydrocarbon residue having 1 to 4 carbon atoms;

(3)

wherein $R_4$ is a hydrogen atom or a methyl group, $A_1$ is an alkylene group having 2 to 6 carbon atoms and n is an integer of 1 to 10;

(4)

wherein $R_5$ is a hydrogen atom or a methyl group and $R_6$ is an alkylene group having 2 to 6 carbon atoms;

(5)

wherein $R_7$ is a saturated or unsaturated hydrocarbon residue having 3 to 10 carbon atoms; and

(6)

wherein $R_8$ is a hydroxyl group or a saturated or unsaturated hydrocarbon residue having 1 to 10 carbon atoms, $A_2$ is an alkylene group having 2 to 4 carbon atoms and m is an integer of 2 to 10.

Each of the solvent represented by the above general formula (1) through (6) is a cosolvent for homogeneously dissolving the lanthanoid-containing compound in the resin-forming starting material. As the solvents, there may be mentioned, for example, unsaturated carboxylic acids such as methacrylic acid and acrylic acid; saturated or unsaturated fatty acids such as propionic acid, octylic acid, isobutyric acid, hexanoic acid, octylbenzoic acid, stearic acid, palmitic acid and naphthenic acid; unsaturated alcohols such as 2-hydroxyethyl acrylate and 2-hydroxyethyl methacrylate; saturated aliphatic alcohols such as propyl alcohol and cyclohexyl alcohol; and glycols such as ethylene glycol, diethylene glycol and propylene glycol. Among these solvents, monomers copolymerizable with methyl methacrylate such as methacrylic acid, acrylic acid, 2-hydroxyethyl methacrylate and 2-hydroxyethyl acrylate, are preferred. These solvents may be used either alone or in the form of a combination of two or more of them. The amount of the solvent used in the present invention is dependent upon the lanthanoid-containing compound and its amount. The amount is, however, up to 40 wt.%, preferably up to 10 wt.%. When it exceeds 40 wt.%, the mechanical and thermal properties of the resulting resin are unsatisfactory.

As a polymerization initiator used in the above-mentioned polymerization reaction, there may be mentioned known radical initiators such as a peroxide, e.g. benzoyl peroxide or lauroyl peroxide; and an azobis compound, e.g. 2,2'-azobisisobutyronitrile, 2,2'-azobis(2,4-dimethylvaleronitrile) or 2,2'-azobis(2,4-dimethyl-4-methoxyvaleronitrile). These polymerization initiators may be used either alone or in the form of a mixture of two or more of them. The amount of the initiator is 0.001 to 1.0 part by weight per 100 parts by weight of the starting material for resin.

Though the polymerization method for obtaining the resin composition of the present invention is not particularly limited, a casting polymerization is preferred. In this method, a mixture of the lanthanoid-containing compound, resin-forming starting material a solvent and optionally additives is poured into a mold constituted by, for example, inorganic glass plates, stainless steel plates, nickel-chromium plates or aluminum plates and a soft polyvinyl chloride gasket to effect the polymerization. The casting polymerization is effected at 45° to 95° C. for 0.3 to 15 hours and then at 100° to 145° C. for 10 min. to 5 hours to complete the polymerization. The polymerization may be effected also by an ionizing radiation method at a low temperature.

The resin composition of the present invention may contain, if necessary, U.V. absorber, releasing agent, thermal stabilizer, colorant and light-scattering agent as well as another known neutron-shielding compound and lead compound.

When the lanthanoid-containing composition of the present invention having excellent optical and mechanical properties is used in combination with a lead compound, it becomes possible to shield all of X-rays, γ-rays and neutron rays. The resin composition of the invention is particularly useful as a thermal neutron, X-rays or γ-rays shielding material. The composition may be used also for the production of an optical filter, selective light absorption filter, illuminating filter, optical lens, optical converter, scintillator, light-emitting material, fluorescent substance-containing composition, refractive index modifier, colorant and illuminating material.

The following examples will further illustrate the present invention, which by no means limit the invention.

In the examples, the total transmission and haze were determined according to ASTM-D-1003-61. The bending breaking strength was determined according to ASTM-D-790. The thermal neutron absorption cross section was determined from values mentioned in "Jikken Kagaku Koza" (12)—Hosha Kagaku (published by Maruzen Co., Ltd.) and according to the following formula:

$$S = \left(\frac{W_1}{M_1} \times S_1 + \frac{W_2}{M_2} \times S_2 + \ldots + \frac{W_n}{M_n} \times S_n\right) \times N$$

wherein:
S is a thermal neutron absorption cross section ($cm^2$) per 100 g of the composition,
$M_i$ is an atomic weight of the i-th element,
$W_i$ is an amount of the i-th element,
$S_i$ is a thermal neutron absorption cross section of the i-th element (barns), and
N is an Avogadro number, (i=1 ... n).

REFERENTIAL EXAMPLE 1

Synthesis of gadolinium methacrylate 0.3 g of hydroquinone monomethyl ether used as the polymerization inhibitor was homogeneously dissolved in a mixture of 280 g of methacrylic acid and 1000 g of toluene. The solution was heated to 60° C. 166 g of powdery gadolinium oxide was added slowly to the solution over 20 min and the resulting mixture was stirred for 1 hour.

The resulting reaction liquid was allowed to stand for one day and filtered. The filtrate was removed to obtain gadolinium methacrylate. Yield: 357 g.

REFERENTIAL EXAMPLE 2

Synthesis of gadolinium nitrate

Slightly excess gadolinium oxide was dissolved in concentrated nitric acid under heating to effect the reaction. After 1 hour, the reaction liquid was filtered and the filtrate was cooled to precipitate crystalline gadolinium nitrate. Yield: 62%.

REFERENTIAL EXAMPLE 3

Synthesis of tris(acetylacetonato)gadolinium 100 cc of acetylacetone and 180 g of gadolinium chloride were suspended in 3000 cc of anhydrous diethyl ether and the resulting suspension was refluxed for 2 hours. Diethyl ether was distilled off to obtain crystalline tris(acetylacetonato)gadolinium. Yield: 65%.

REFERENTIAL EXAMPLE 4

Synthesis of samarium methacrylate 0.3 g of hydroquinone monomethyl ether as the polymerization inhibitor was homogeneously dissolved in a mixture of 280 g of methacrylic acid and 1000 g of toluene. The solution was heated to 60° C. 174 g of samarium oxide was added slowly to the solution over 20 min and the resulting mixture was stirred for 1 hour.

The resulting reaction liquid was allowed to stand for one day and filtered. The filtrate was removed to obtain samarium methacrylate. Yield: 370 g.

REFERENTIAL EXAMPLE 5

Synthesis of samarium nitrate

Slightly excess samarium oxide was dissolved in concentrated nitric acid under heating to effect the reaction. After 1 hour, the reaction liquid was filtered and the filtrate was cooled to precipitate crystalline samarium nitrate. Yield: 60%.

REFERENTIAL EXAMPLE 6

Synthesis of tris(acetylacetonato)samarium 100 cc of acetylacetone and 180 g of samarium chloride were suspended in 3000 cc of anhydrous diethyl ether and the resulting suspension was refluxed for 2 hours. Diethyl ether was distilled off to obtain crystalline tris(acetylacetonato)samarium. Yield: 65%.

REFERENTIAL EXAMPLE 7

Synthesis of europium methacrylate 0.3 g of hydroquinone monomethyl ether as the polymerization inhibitor was homogeneously dissolved in a mixture of 280 g of methacrylic acid and 1000 g of toluene. The solution was heated to 60° C. 176 g of powdery europium oxide was added slowly to the solution over 20 min and the resulting mixture was stirred for 1 hour.

The resulting reaction liquid was allowed to stand for one day and filtered. The filtrate was removed to obtain europium methacrylate. Yield: 350 g.

REFERENTIAL EXAMPLE 8

Synthesis of europium nitrate

Slightly excess europium oxide was dissolved in concentrated nitric acid under heating to effect the reaction. After 1 hour, the reaction liquid was filtered and the filtrate was cooled to precipitate crystalline europium nitrate. Yield: 65%.

REFERENTIAL EXAMPLE 9

Synthesis of tris(acetylacetonato)europium 100 cc of acetylacetone and 174 g of europium chloride were suspended in 3000 cc of anhydrous diethyl ether and the resulting suspension was refluxed for 2 hours. Diethyl ether was distilled off to obtain crystalline tris(acetylacetonato)europium. Yield: 70%.

EXAMPLE 1

3 g of gadolinium nitrate synthesized in Referential Example 2 was dissolved in mixture of 17 g or 2-hydroxyethyl methacrylate and 2 g of propylene glycol. 78 g of methyl methacrylate was added to the solution and they were stirred to obtain a transparent liquid mixture.

0.04 g of 2,2'-azobis(2,4-dimethylvaloronitrile) as the polymerization catalyst and 0.005 g of sodium dioctyl sulfosuccinate as the releasing agent were dissolved in the liquid mixture. After degasification, the solution was poured into an ordinary inorganic glass mold designed for forming a plate of 3 mm thickness. The mold was immersed in warm water at 65° C. for 180 min and then kept in an air bath at 110° C. for 120 min to complete the polymerization. A resin plate taken out of the mold was transparent.

EXAMPLE 2

1.5 g of gadolinium nitrate synthesized in Referential Example 2 was dissolved in 8.5 g of 2-hydroxyethyl methacrylate. The resulting solution was added to 90 g of methyl methacrylate and they were stirred to obtain a transparent liquid mixture. The same polymerization catalyst and releasing agent in the same amounts as in Example 1 were added to the liquid mixture and the casting polymerization was carried out under the same conditions as in Example 1. The resulting resin plate was transparent.

EXAMPLE 3

1.5 g of tris(acetylacetonato)gadolinium synthesized in Referential Example 3 was dissolved in 8.5 g of methacrylic acid. The resulting solution was added to 90 g of methyl methacrylate and they were stirred.

The same polymerization catalyst and releasing agent in the same amounts as in Example 1 were added to the liquid mixture and the casting polymerization was carried out in the same manner as in Example 1. A resin plate taken out of the mold after completion of the polymerization was transparent.

EXAMPLE 4

8 g of gadolinium methacrylate synthesized in Referential Example 1 was mixed with 2 g of n-octylic acid, 1 g of propylene glycol, 1 g of 2-hydroxyethyl methacrylate, 5 g of styrene and 83 g of methyl methacrylate. The casting polymerization was effected under the same polymerization conditions as in Example 1. The resulting resin plate was transparent.

EXAMPLE 5

3 g of gadolinium acrylate, 3 g of samarium methacrylate, 1 g of europium methacrylate, 3 g of n-octylic acid, 1 g of propylene glycol and 89 g of methyl methacrylate were mixed together. The casting polymerization was carried out under the same polymerization conditions as in Example 1. The resulting resin plate was transparent.

EXAMPLE 6

4 g of gadolinium methacrylate obtained in Referential Example 1, 4 g of lead methacrylate, 3 g of n-octylic acid, 2 g of propylene glycol, 1 g of 2-hydroxyethyl methacrylate and 86 g of methyl methacrylate were mixed together. The casting polymerization was carried out under the same conditions as in Example 1. The resulting resin plate was transparent.

EXAMPLE 7

0.04 part by weight of α,α'-azobis (2,4-dimethylvaleronitrile) as the polymerization catalyst, 0.005 part by weight of sodium dioctyl sulfosuccinate as the releasing agent and 2.0 parts by weight of gadolinium oxide having an average particle diameter of 2μ were added to 100 parts by weight of a partial polymer (polymer content: 18%) of methyl methacrylate. They were stirred, degasified and poured into a mold for forming a plate of 3 mm thickness which mold was constituted by a reinforced glass and a soft vinyl chloride gasket. The mold was immersed in warm water at 70° C. for 60 min and then kept in an air bath at 130° C. for 80 min to complete the polymerization, thereby obtaining a resin plate.

EXAMPLE 8

2.0 parts by weight of gadolinium hydroxide having an average particle diameter of 0.5μ and 1.0 part by weight of gadolinium carbonate having an average particle diameter of 2μ were added to 100 parts by weight of a methacrylic resin (Acrypet VH; a trademark of Mitsubishi Rayon Co., Ltd.). They were mixed thoroughly with a tumbler to obtain a homogeneous mixture. The mixture was extruded through an extruder by an ordinary method to obtain a sheet having 3 mm thickness.

EXAMPLE 9

3 g of samarium nitrate synthesized in Referential Example 5 was dissolved in a liquid mixture of 17 g of 2-hydroxyethyl methacrylate and 2 g of propylene glycol. 78 g of methyl methacrylate was added to the solution and they were stirred to obtain a transparent liquid.

Then, the same polymerization catalyst and releasing agent in the same amounts as in Example 1 were added to the liquid mixture and the casting polymerization was carried out in the same manner as in Example 1. A resin plate taken out of the mold was transparent.

EXAMPLE 10

1.5 g of samarium nitrate synthesized in Referential Example 5 was dissolved in 8.5 g of 2-hydroxyethyl methacrylate. The resulting solution was added to 90 g of methyl methacrylate and they were stirred to obtain a transparent liquid mixture. The same polymerization catalyst and releasing agent in the same amounts as in Example 1 were added to the liquid mixture and the casting polymerization was carried out in the same manner as in Example 1 to obtain a transparent resin plate.

EXAMPLE 11

1.5 g of tris(acetylacetonato)samarium synthesized in Referential Example 6 was dissolved in 8.5 g of methacrylic acid. The resulting solution was added to 90 g of methyl methacrylate and they were stirred.

The same polymerization catalyst and releasing agent in the same amounts as in Example 1 were added to the liquid mixture and the casting polymerization was carried out in the same manner as in Example 1. A resin plate taken out of the mold after completion of the polymerization was faintly yellow and transparent.

EXAMPLE 12

8 g of samarium methacrylate synthesized in Referential Example 4, 2 g of n-octylic acid, 1 g of propylene glycol, 1 g of 2-hydroxyethyl methacrylate, 5 g of styrene and 83 g of methyl methacrylate were mixed together. The casting polymerization was effected under the same polymerization conditions as in Example 1. The resulting resin plate was faintly yellow and transparent.

EXAMPLE 13

The same procedure as in Example 7 was repeated except that 2.0 parts by weight of gadolinium oxide was replaced with 2.0 parts by weight of samarium oxide.

EXAMPLE 14

The same procedure as in Example 8 was repeated except that 2.0 parts by weight of gadolinium hydroxide and 1.0 part by weight of gadolinium carbonate were replaced with 2.0 parts by weight of samarium hydroxide and 1.0 part by weight of samarium carbonate.

EXAMPLE 15

The same procedure as in Example 1 was repeated except that 3 g of gadolinium nitrate was replaced with 3 g of europium nitrate synthesized in Referential Example 8. A resin plate taken out of the mold was transparent.

EXAMPLE 16

The same procedure as in Example 2 was repeated except that 1.5 g of gadolinium nitrate was replaced with 1.5 g of europium nitrate. The resulting resin plate was transparent.

EXAMPLE 17

The same procedure as in Example 3 was repeated except that 1.5 g of tris(acetylacetonato)gadolinium was replaced with 1.5 g of tris(acetylacetonato)europium synthesized in Referential Example 9. A resin plate taken out of the mold after completion of the polymerization was transparent.

EXAMPLE 18

The same procedure as in Example 4 was repeated except that 8 g of gadolinium methacrylate was replaced with 8 g of europium methacrylate synthesized in Referential Example 7. The resulting resin plate was transparent.

EXAMPLE 19

The same procedure as in Example 7 was repeated except that 2.0 parts by weight of gadolinium oxide was replaced with 2.0 parts by weight of europium oxide.

EXAMPLE 20

The same procedure as in Example 8 was repeated except that gadolinium hydroxide and gadolinium carbonate were replaced with europium hydroxide and europium carbonate, respectively.

The results of the examination of the total transmission (%), haze (%), bending breaking strength (kg/cm$^2$) and neutron-shielding capacity (thermal neutron absorption cross section) of the methacrylic resin plates obtained in Examples 1 to 20 are shown in Table 1.

TABLE 1

| | Total transmission (%) | Haze (%) | Bending breaking strength (kg/cm$^2$) | Thermal neutron absorption cross section (cm$^2$) |
|---|---|---|---|---|
| Ex. 1 | 92.2 | 1.5 | 740 | 2400 |
| Ex. 2 | 92.4 | 1.8 | 750 | 1200 |
| Ex. 3 | 92.5 | 1.8 | 720 | 840 |
| Ex. 4 | 91.2 | 2.0 | 700 | 5400 |
| Ex. 5 | 92.2 | 1.5 | 650 | 2700 |
| Ex. 6 | 90.3 | 2.7 | 680 | 2700 |
| Ex. 7 | 90.5 | 80 | 680 | 3400 |
| Ex. 8 | 89.5 | 85 | 675 | 5200 |
| Ex. 9 | 92.1 | 1.5 | 735 | 300 |
| Ex. 10 | 92.1 | 1.7 | 740 | 150 |
| Ex. 11 | 92.0 | 2.0 | 700 | 100 |
| Ex. 12 | 91.0 | 2.5 | 700 | 670 |
| Ex. 13 | 89.5 | 78 | 675 | 430 |
| Ex. 14 | 88.2 | 87 | 680 | 550 |
| Ex. 15 | 92.3 | 1.6 | 720 | 250 |
| Ex. 16 | 92.1 | 1.6 | 720 | 125 |
| Ex. 17 | 92.4 | 2.0 | 720 | 87 |
| Ex. 18 | 91.0 | 1.8 | 680 | 550 |
| Ex. 19 | 90.2 | 75 | 675 | 360 |
| Ex. 20 | 89.0 | 82 | 675 | 660 |

TABLE 1-continued

| | Total transmission (%) | Haze (%) | Bending breaking strength (kg/cm$^2$) | Thermal neutron absorption cross section (cm$^2$) |
|---|---|---|---|---|
| Ref. Ex. methacrylic resin plate (registered trademark: Shinkolyte S; a product of Mitsubishi Rayon Co., Ltd.) | 93.0 | 1 | 1200 | up to 2 |

EXAMPLES 21 TO 25 AND COMPARATIVE EXAMPLES 1 AND 2

Resin plates were prepared in the same manner as in Example 1 except that the concentration of gadolinium nitrate synthesized in Referential Example 2 was altered as shown in Table 2. Their physical properties are also shown in Table 2.

TABLE 2

| | Gadolinium nitrate | | Total transmission (%) | Haze (%) | Bending bleaking strength (kg/cm$^2$) | Thermal neutron absorption cross section (cm$^2$) |
|---|---|---|---|---|---|---|
| | Amount (g) | Atomic conc. of gadolinium in the total composition (%) | | | | |
| Comp. Ex. 1 | 0 | 0 | 93 | 1 | 1200 | up to 2 |
| Ex. 21 | 0.022 | 0.01 | 92 | 1 | 1100 | 20 |
| Ex. 22 | 0.22 | 0.1 | 92 | 1 | 1100 | 180 |
| Ex. 23 | 1.1 | 0.5 | 92 | 1 | 820 | 880 |
| Ex. 24 | 2.2 | 1.0 | 92 | 1 | 700 | 1800 |
| Ex. 25 | 11.0 | 5.0 | 90 | 8 | 700 | 8800 |
| Comp. Ex. 2 | 33.0 | 15.0 | 75 | 82 | 120 | 26000 |

EXAMPLE 26

3 g of neodymium nitrate produced in the same manner as in Referential Example 2 was dissolved in 8.5 g of 2-hydroxyethyl methacrylate. 88.5 g of styrene was added to the resulting solution and they were stirred. 0.05 g of 2,2'-azobis(2,4-dimethylvaleronitrile) as the polymerization catalyst and 0.005 g of sodium dioctyl sulfosuccinate as the releasing agent were dissolved in the liquid mixture. After degasification, the mixture was poured in an ordinary inorganic glass mold designed for forming a plate of 3 mm thickness. The mold was immersed in warm water at 65° C. for 180 min and then kept in an air bath at 110° C. for 120 min to complete the polymerization. Thus, a transparent resin plate was obtained.

EXAMPLE 27

The same procedure as in Example 2 was repeated except that methyl methacrylate was replaced with styrene. The resulting resin was transparent.

EXAMPLE 28

The same procedure as in Example 3 was repeated except that tris(acetylacetonato)gadolinium was replaced with tris(acetylacetonato)neodymium and methyl methacrylate was replaced with styrene. The resulting resin plate was transparent.

EXAMPLE 29

2.0 parts by weight of neodymium hydroxide having an average particle diameter of 0.5μ and 1.0 part by weight of neodymium carbonate having an average particle diameter of 2μ were added to 100 parts by weight of AS resin (trade name: Lytak #330; a product of Mitsui Toatsu Chemicals, Inc.). They were mixed thoroughly by means of a tumbler and then extruded through an extruder by an ordinary method to obtain a sheet having 3 mm thickness.

EXAMPLE 30

4 g of gadolinium 2-(meth)acryloxyethyl succinate, 2 g of n-octylic acid, 1 g of propylene glycol, 1 g of 2-hydroxyethyl methacrylate and 92 g of methyl methacrylate were mixed together. The casting polymerization was carried out under the same polymerization conditions as in Example 1. The resulting resin plate was transparent and had physical properties equivalent to those of the resin obtained in Example 1.

EXAMPLE 31

The casting polymerization was carried out in the same manner as in Example 1 except that gadolinium nitrate was replaced with erbium nitrate, lanthanum nitrate, praseodymium nitrate or ytterbium nitrate. The resulting resin plates were transparent.

What is claimed is:

1. A process for producing a synthetic resin composition, which comprises:
    dispersing or dissolving at least one lanthanoid-containing compound selected from the group consisting of oxides, hydroxides, inorganic and/or organic acid salts and complexes of lanthanoids in a resin-forming starting material selected from the group consisting of (1) at least one vinyl monomer selected from the group consisting of acrylic acid, methacrylic acid, acrylic acid esters, methacrylic acid esters, styrene and substituted styrene compounds, (2) mixtures of said at least one vinyl monomer with another copolymerizable vinyl monomer and (3) a partially polymerized product thereof; and then
    polymerizing the resin-forming starting material by bulk or solution polymerization.

2. The process according to claim 1 wherein the vinyl monomer is at least one member of the group selected from methacrylic acid, acrylic acid and (meth)acrylic esters or a monomer mixture of the above-mentioned monomers with another copolymerizable ethylenic monomer.

3. The process according to claim 1 wherein the vinyl monomer is styrene or a monomer mixture mainly comprising styrene.

4. The process according to claim 1 wherein the inorganic acid salt of lanthanoid is sulfate, nitrate, carbonate, phosphate or hydrochloride thereof.

5. The process according to claim 1 wherein the organic acid salt of lanthanoid is acetate, octylate, caproate, caprylate, laurate isobutyrate, or isovalerate or a double salt of them.

6. The process according to claim 1 wherein the organic acid salt of lanthanoid is a salt of a compound of the formula:

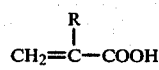  (I)

wherein R is a hydrogen atom or a methyl group, or a salt of a compound of the formula:

  (II)

wherein R' is a hydrogen atom or a methyl group, R" is

—C$_2$H$_4$OCOC$_2$H$_4$—,

—C$_2$H$_4$OCOCH=CH'—,

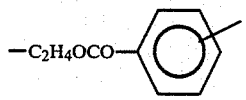

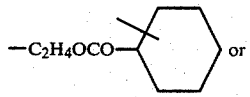 or

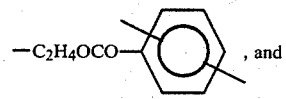 , and n is 1 or 2.

7. The process according to claim 1 wherein the complex of lanthanoid is obtained by reacting a lanthanoid compound with a β-diketone or cupferron.

8. The process according to claim 1 wherein the lanthanoid containing compound dispersed in the resin-forming starting material has an average particle size within the range of 0.2 to 20 μm.

9. The process according to claim 1 wherein the atomic concentration of the lanthanoid in the lanthanoid-containing compound is 0.001 to 10 wt.% based on the total resin composition.

10. A process for producing a synthetic resin composition, which comprises:
bulk or solution polymerizing a mixture comprising:
(a) a resin-forming starting material selected from the group consisting of (1) at least one vinyl monomer selected from the group consisting of acrylic acid, methacrylic acid, acrylic acid esters, methacrylic acid estrs, styrene and substituted styrene compound, (2) mixtures of said at least one vinyl monomer with another copolymerizable vinyl monomer and (3) a partially polymerized product thereof;
(b) at least one lanthanoid-containing compound selected from the group consisting of oxides, hydroxides, inorganic and/or organic acid salts and complexes of lanthanoids; and
(c) a solvent capable of dissolving therein the resin-forming starting material and the lanthanoid-containing compound.

11. The process according to claim 10 wherein the vinyl monomer is at least one member of the group selected from methacrylic acid, acrylic acid and (meth-)acrylic esters or a monomer mixture of the above-mentioned monomers with another copolymerizable ethylenic monomer.

12. The process according to claim 10 wherein the vinyl monomer is styrene or a monomer mixture mainly comprising styrene.

13. The process according to claim 10 wherein the inorganic acid salt of lanthanoid is sulfate, nitrate, carbonate, phosphate or hydrochloride thereof.

14. The process according to claim 10 wherein the organic acid salt of lanthanoid is acetate, octylate, caproate, caprylate, laurate, isobutyrate or isovalerate or a double salt of them.

15. The process according to claim 10 wherein the organic acid salt of lanthanoid is a salt of a compound of the general formula:

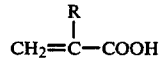  (I)

wherein R is a hydrogen atom or a methyl group, or a salt of a compound of the general formula:

  (II)

wherein R' is a hydrogen atom or a methyl group, R" is

—C$_2$H$_4$OCOC$_2$H$_4$—,

—C$_2$H$_4$OCOCH=CH'—,

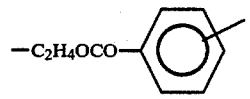

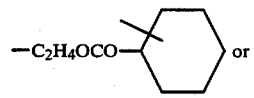 or

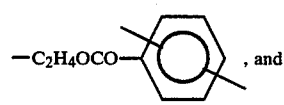 , and n is 1 or 2.

16. The process according to claim 10 wherein the complex of lanthanoid is obtained by reacting a lanthanoid compound with a β-diketone or cupferron.

17. The process according to claim 10 wherein the atomic concentration of the lanthanoid in the lanthanoid-containing compound is 0.001 to 10 wt.% based on the total resin composition.

18. The process according to claim 10 wherein the solvent (c) is selected from the group consisting of compounds represented by the following formulae:

$$R_1-\overset{O}{\underset{\parallel}{C}}-OH \qquad (1)$$

wherein $R_1$ is a saturated or unsaturated hydrocarbon residue having 1 to 20 carbon atoms;

$$R_2-O-\overset{O}{\underset{\parallel}{C}}-R_3-\overset{O}{\underset{\parallel}{C}}-OH \qquad (2)$$

wherein $R_2$ is a hydrogen atom or a saturated or unsaturated hydrocarbon residue having 1 to 9 carbon atoms and $R_3$ is a saturated or unsaturated hydrocarbon residue having 1 to 4 carbon atoms;

$$CH_2=\overset{R_4}{\underset{|}{C}}-\overset{O}{\underset{\parallel}{C}}-O(A_1O)_{\overline{n}}H \qquad (3)$$

wherein $R_4$ is a hydrogen atom or a methyl group, $A_1$ is an alkylene group having 2 to 6 carbon atoms and n is an integer of 1 to 10;

$$CH_2=\overset{R_5}{\underset{|}{C}}-\overset{O}{\underset{\parallel}{C}}-O-R_6-OH \qquad (4)$$

wherein $R_5$ is a hydrogen atom or a methyl group and $R_6$ is an alkylene group having 2 to 6 carbon atoms;

$$R_7-OH \qquad (5)$$

wherein $R_7$ is a saturated or unsaturated hydrocarbon residue having 3 to 10 carbon atoms; and $$R_8-(A_2-O)_{\overline{m}}H \qquad (6)$$

wherein $R_8$ is a hydroxyl group or a saturated or unsaturated hydrocarbon residue having 1 to 10 carbon atoms, $A_2$ is an alkylene group having 2 to 4 carbon atoms and m is an integer of 1 to 10.

19. The process according to claim 18 wherein the solvent is at least one selected from the group consisting of unsaturated carboxylic acids, saturated or unsaturated fatty acids, esters containing a hydroxyl group, unsaturated or saturated alcohols and glycols.

20. The process according to claim 18 wherein the amount of the solvent added is up to 40 wt.%.

* * * * *